United States Patent
Mongrain (10) Patent No.: US 6,698,980 B2
(45) Date of Patent: Mar. 2, 2004

(54) ROCK STABILIZING APPARATUS AND METHOD

(75) Inventor: Rock Mongrain, Rouyn-Noranda (CA)

(73) Assignee: Stewart Mining Products Inc., Rouyn-Noranda (CA)

(*) Notice: Subject to any disclaimer, the term of this patent is extended or adjusted under 35 U.S.C. 154(b) by 0 days.

(21) Appl. No.: 09/918,430

(22) Filed: Jul. 30, 2001

(65) Prior Publication Data

US 2003/0026664 A1 Feb. 6, 2003

(51) Int. Cl.[7] .................... E21D 21/00; E21D 20/02; F16B 31/00
(52) U.S. Cl. .................... 405/259.5; 411/4; 464/33
(58) Field of Search .................... 405/259.1, 259.5, 405/259.6; 411/4; 464/32, 33

(56) References Cited

U.S. PATENT DOCUMENTS

| | | | | |
|---|---|---|---|---|
| 3,191,486 A | * | 6/1965 | Gibbens | 411/4 |
| 4,144,796 A | * | 3/1979 | Richter et al. | 411/4 |
| 4,173,918 A | * | 11/1979 | Piersall | 411/51 |
| 4,904,122 A | * | 2/1990 | Herbst et al. | 405/259.1 |
| 5,256,015 A | * | 10/1993 | St. Clair | 411/4 |
| 5,397,202 A | * | 3/1995 | Shrader et al. | 405/259.6 |
| 6,273,646 B1 | * | 8/2001 | Shaw | 405/259.1 |

OTHER PUBLICATIONS

Machine Design, Nonthreaded Fasteners, Oct. 1990, pp. 323, 324, 326, 328, 330, 331, 334, and 335.*

* cited by examiner

Primary Examiner—Thomas B. Will
Assistant Examiner—Tara L. Mayo

(57) ABSTRACT

A rock stabilizing apparatus and method for use with adhesion materials has a tensionable reinforcing member having a threaded portion at one end and an opposite end. The member-threaded portion threadably receives a nut and a bearing plate is retained on the member-threaded portion by the nut. A shearing element is provided for temporarily fixing the nut in a first operating position. At a predetermined torque, the shearing element fails and the nut is freed to advance on the threaded member portion from the first temporary operating position to a second permanent operating position. The first fixed operating position is located at the top end of the member-threaded portion. The second operation position is located at the bottom end of the member-threaded portion so that the bearing plate is in abutting contact with the face of the rock formation. In its first operating position the nut and reinforcing member may be rotated together for mixing the adhesion materials located within the drill hole.

8 Claims, 6 Drawing Sheets

ROCK STABILIZING APPARATUS AND METHOD

BACK GROUND OF THE INVENTION

1. Field of the Invention

This invention relates to a rock stabilizing apparatus and method for anchoring unstable rock formations in underground mines and more particularly relates to an apparatus and method using a tension member that is embedded into a hardenable adhesion material for creating stabilizing forces within an unstable rock formation.

2. Background of the Invention

In underground mines it is important to secure the roof and walls of a tunnel against collapse of unstable rock formations that will hang from stable rock formations. Such situations may be caused by having to tunnel through naturally fractured rock formations or by blasting operations within the mine. Scaling the roof and walls of a newly formed tunnel is necessary to remove loose rock that could easily collapse. Scaling is a process whereby a miner uses a long pole to pry and remove loose rock, called scale, from the roof and walls of the tunnel. After removing the scale it is necessary to anchor the walls and roof of the tunnel to more stable rock formations. This is accomplished through the use of devices that are generally called rock bolts. Holes are drilled into the walls and roof of the tunnel a sufficient distance to penetrate the unstable formations surrounding the roof and walls of the tunnel and enter stable formations. Rock bolts of adequate length are then inserted into the holes. The inserted end of the rock bolt is anchored to the stable rock formation using mechanical expansion clamps or hardenable adhesion material. The end of the rock bolt protruding from the hole is generally threaded. A nut and anchor plate is often used to apply a stabilizing compressive force to the rock formation and tension the rock bolt supporting the roof and wall loads. Steel netting may be strung across the roof and walls from plurality of rock bolts for further security. As well, concrete is often applied to the surfaces of the tunnel providing even more strength to the tunnel. Where adhesion material is used to anchor the rock bolt to the stable rock formation the rock bolt can be used to rotate and mix the adhesion material so that it will cure and bind the bolt to the walls of the borehole.

A number of roof bolts and anchoring systems using hardenable materials have been proposed for use in mining applications. One example is found in U.S. Pat. No. 4,904,122 "Anchoring Device, Such As A Rock Anchor" issued to Herbst and Schnitzler in 1990. This device is not well suited to applications where the reinforcing rod is used to mix adhesion materials during curing because there is disclosed no way to rotate the rod within the hole. Another example is found in U.S. Pat. No. 4,051,683 "Method and Apparatus For Supporting A Mine Roof" issued to Koval in 1977. This system has a number of disadvantages. It relies upon a plurality of parts making it difficult to use in underground mining operations. It relies upon on a relatively complex coupling device that that will be expensive to manufacture and therefore adds expense to the cost of the overall system. The reliance upon a coupling between the bolting rod and the reinforcing rod creates a weak link that may fail during rotation necessitating the entire system and adhesion material to be removed from the hole. A similar system is found in U.S. Pat. No. 5,785,463 "Combination Cable Bolt System" issued to Eaton et al in 1998 having similar deficiencies relating to complexity, expense and inherent weaknesses caused by coupling mechanisms Therefore there is a continued need for an apparatus and method for anchoring unstable rock formations in underground mines using a tension member with adhesion materials that is simple and inexpensive to manufacture and use and does not rely upon coupling mechanisms with their inherent weaknesses.

OBJECTS OF THE INVENTION

It is an object of the present invention to overcome the deficiencies in the prior art.

It is a further object of the invention to provide a rock stabilizing apparatus and method for anchoring unstable rock formations in underground mines.

Yet another object of the present invention is to provide a rock stabilizing apparatus and method for anchoring unstable rock formations adapted for applications where adhesion materials are used to fix the reinforcing member within the borehole.

Still another object of the invention is to provide a rock stabilizing apparatus and method for anchoring unstable rock formations in underground mines using a tensionable member and adhesion materials that is easy and inexpensive to and manufacture; does not rely upon a plurality of dependent parts; and, does not rely upon a coupling device.

SUMMARY OF THE INVENTION

The objects of the present invention are satisfied through the provision of a rock stabilizing apparatus and method for anchoring unstable rock formations adapted for use with adhesion material. The apparatus comprises an elongated reinforcing member having a threaded portion at a bottom end; and, a top end adapted to be embedded permanently within a hardenable adhesion material within the drilled hole. The threaded bottom portion and the top end are at opposite ends of the same member. The reinforcing end is inserted into a drilled hole through the unstable rock formation into stable rock. The drilled hole is sufficiently deep so that when the member is entirely inserted into the drilled hole the threaded end is partially inserted into the drilled hole. There is at least one bearing plate member retained on the threaded bolt portion of the reinforcing member. The threaded portion has a top end and a bottom end, and can be rotated through the centre of the plate. The plate can be advanced so that it abuts against the rock face for transmitting compressive forces to the rock face. There is at least one nut threadably advanceable over the threaded portion. The nut acts to advance the bearing plate to the rock face and applies a tensioning force into the reinforcing member when it is tightened against the bearing plate. A shearing element is provided within the nut that shearably fixes the nut to a predetermined and variable position on the threaded portion of the reinforcing member. The nut has a first temporary pre-torgue$_{max}$ operating position wherein it is fixed to the member-threaded portion at its bottom end by the shearing element thus permitting the nut and member to be rotated as one. The first temporary pre-torque$_{max}$ operation position is adopted when it is necessary to mix adhesion material within the borehole for curing. The nut has a second post-torque$_{max}$ permanent operation position that is adopted once the shearing element has sheared at torque$_{shear}$ and the nut is free to advance along the threaded portion of the reinforcing member. This second post-torque$_{max}$ operating position is adopted when it is necessary to abut the bearing plate against the rock formation and then further torque the nut to torque$_{max}$ thus adding compressive forces to the rock formation through the bearing plate and also adding tensile forces to the reinforcing member anchored within the drilled hole. The shearing element is adapted to shear at torque$_{shear}$ when a predetermined amount of torque is applied to the nut. Torque$_{shear}$ occurs at a predeterminable torque that is made dependent upon the curing properties of the adhesion material. The breakage of the shearing element at torque$_{shear}$ will not damage the threads on the member. Additionally, the remnants of the shearing element, once sheared, are retained within their respective bores to eliminate safety hazards that may result from energized pieces of the shearing element acting as projectiles.

A method is provided for using a rock stabilizing apparatus in underground mining operations. A hole is drilled through unstable rock strata a substantial distance into stable rock strata. The reinforcing member is prepared by threading at least one nut onto the threaded end of the reinforcing member and then fixing the nut to the threaded portion of the member using at least one shearing element. Typically, the members will arrive on site with the nut already threaded and fixed to the reinforcing member. The member will also be of a predetermined length and width adapted to fit the drilled hole. The shearing element will also have a torque$_{shear}$ that is predetermined to suit the size and strength of the member and the properties of the adhesion material. At least one bearing plate is then placed on the unthreaded end of the member and moved to the threaded end. The member is inserted into the drilled hole and the hardenable adhesion material is inserted into the annulus between the member and the drilled hole walls. A rotational movement is imparted to the member through the nut by a rotating device in order to thoroughly mix the adhesion materials elements and fill the annulus between the reinforcing member and the walls of the drilled hole. Once the adhesion material stiffens, additional torque will have to be applied to the nut until the shearing element reaches its torque$_{shear}$. Once the shearing element fails, the nut will advance towards the rock face along the threads forcing the bearing plate into an abutting relationship against the rock face. A predetermined amount of torque$_{max}$ can then be applied to the nut thereby tensioning the reinforcing bar by a desired amount.

Further objects and advantages of this invention will become apparent from a consideration of the following drawings, detailed description and claims.

DESCRIPTION OF THE INVENTION

Figure 1:
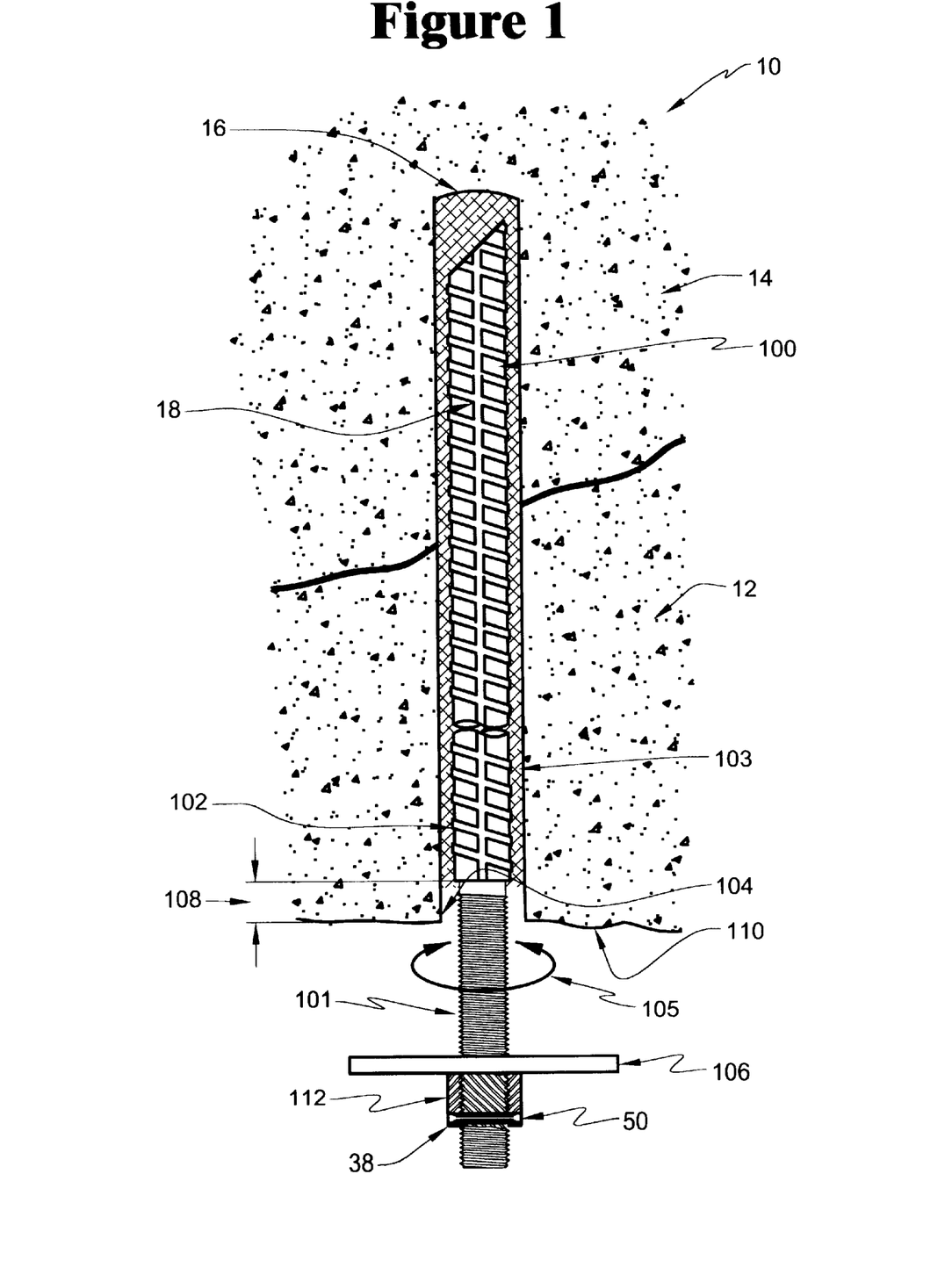
FIG. 1 is a partial sectional side view of a rock stabilizing apparatus for anchoring unstable rock formations in an underground mine according to a preferred embodiment of the present invention showing the nut in its first operating position.
Figure 4:
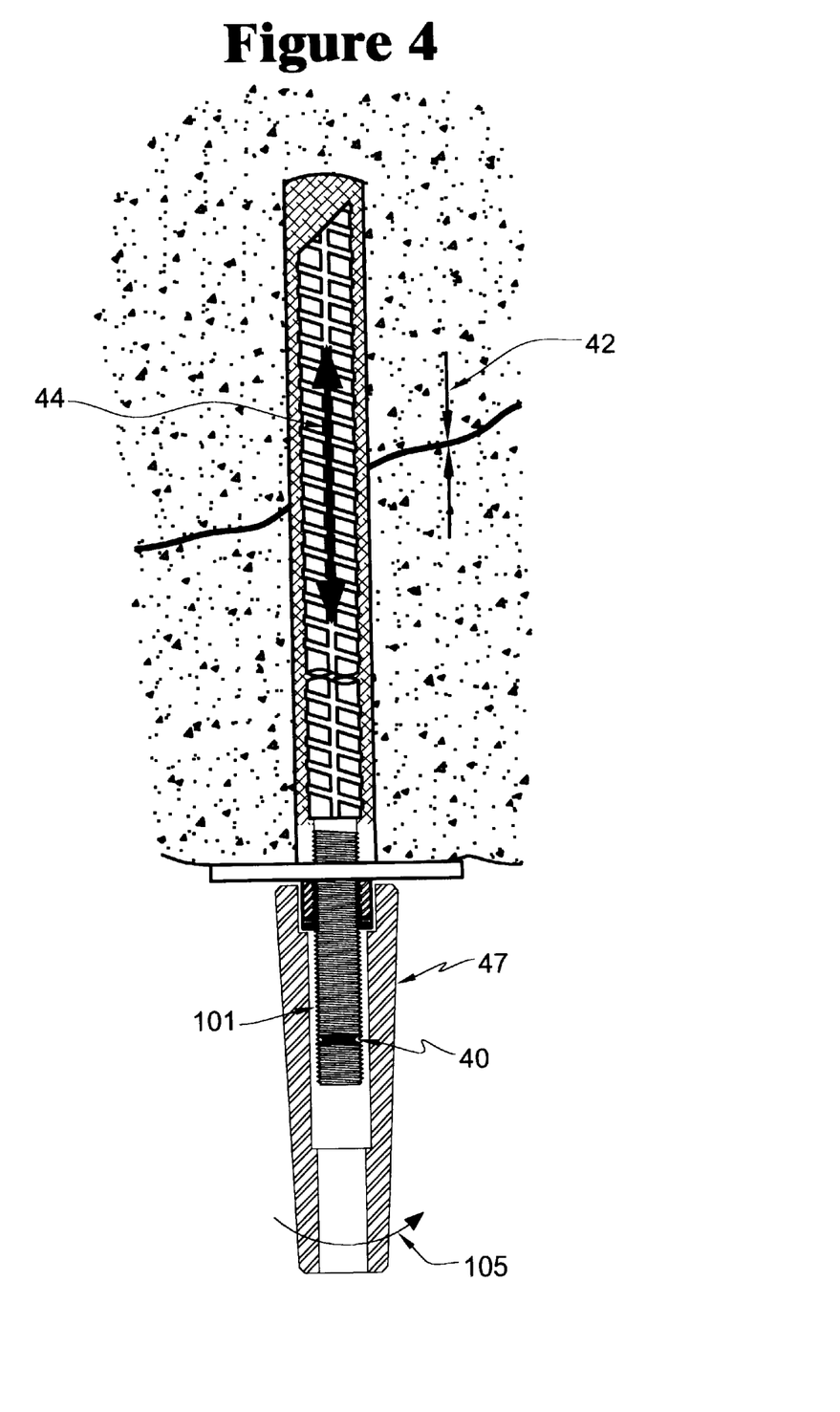
FIG. 4 is a side partial sectional view of a rock stabilizing apparatus for anchoring unstable rock formations in an underground mine according to a preferred embodiment of the invention showing the nut in its second operating position.

Referring to FIG. 1 there is shown a rock stabilizing apparatus for anchoring unstable rock formations (12) to stable rock formations (14) in mining operations of a preferred embodiment of the invention generally designated as (10). The apparatus is shown in its pre-torque$_{max}$ and pre-torque$_{shear}$ states. The apparatus is adapted to be inserted into a pre-drilled hole (16) that extends through the unstable portion (12) to a stable portion (14) of the rock formation as might be found in the roof or wall of a mine tunnel. The apparatus comprises a tensionable member (18). In a preferred embodiment of the invention the member is a reinforcing member generally tubular in shape having a top ribbed portion (100) and a bottom threaded portion (101). In alternative embodiments of the invention the reinforcing member may comprise one of a steel bar, a cone bolt, a standard rock bolt, or a reinforcing cable. The portion inserted into the drilled hole may be smooth or textured to promote adhesion to the adhesion material. As shown in FIG. 1, the diameter of the member (18) is less than the diameter of the drilled hole (16). This forms an annulus (103) around the member (18). The annulus is filled with a suitable hardenable adhesion material (102) such as a polyester resin. Using resin to exemplify a preferred embodiment, the resin may be inserted into the drilled hole prior to insertion of the member as binary packages so that when the rod is inserted into the drilled hole the packages are ruptured and their contents mix and cure into a hardened resin. Alternatively, the resin may be formulated in such a way that it can be pumped onto the annulus after the member is inserted and mixed and cured by rotation (105) of the member in the drilled hole as further described herein. The ribbed portion (100) facilitates the fixing of the adhesion material to the member. The adhesion material (102) can also be a cementatious material depending upon the nature of the installation and the type of rock. The adhesion material (102) operatively connects the member (18) to the wall (104) of drilled hole (16) permitting the transfer of forces between the member and the rock formation through the adhesion material. As shown in this preferred embodiment of the invention, the entire ribbed portion (100) of the member and a small threaded portion (108) is inserted into the drilled hole (16). This permits bearing plate (106) to be placed in a tight abutting relationship with the face of the rock formation (110) as shown in FIG. 4. Bearing plate (106) is adapted to move freely along the length of the threaded portion (101) of the member so that as nut (112) is advanced along threaded portion (101), the bearing plate can be forced into an abutting relationship with the rock face and compressive forces applied to the rock formation. It is understood that multiple bearing plates and washers can be installed between nut (112) and the rock face (110) as required. Nut (112) is preferably a square nut because a square nut can be driven by existing rock bolt installing apparatus. The corners of the square nut are also more resistive to shearing forces generated when large amounts of torque are applied to the nut such as during tensioning of the member. However, where appropriate, other conventional polygonal nut shapes can be used. A single shearing element (50) is shown placed within the second bore (38) as more fully described below.

Figure 2:
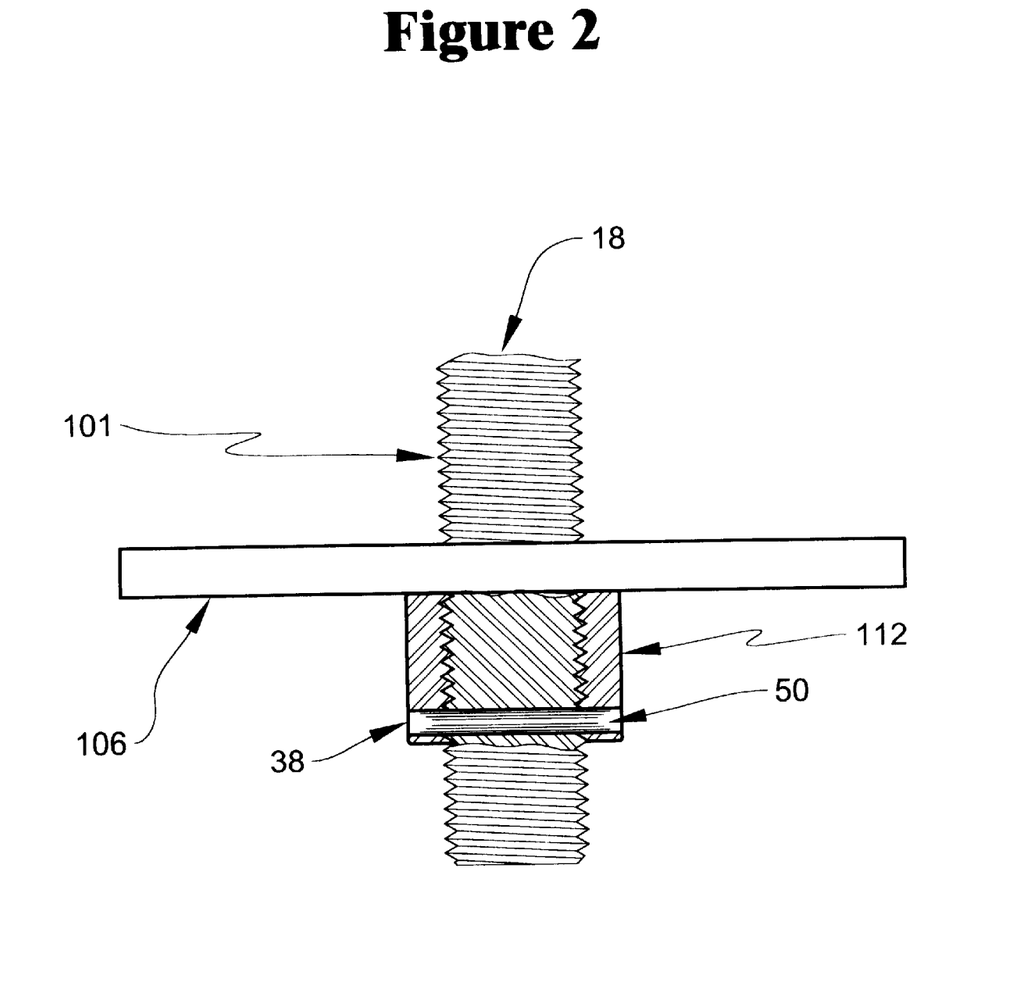
FIG. 2 is a sectional side view of the nut of a preferred embodiment of the present invention.

Referring to FIG. 2 there is illustrated in partial sectional side view a square nut (112) used in a preferred embodiment of the present invention. The nut (112) is threadably received onto the threaded portion (101) of the member (18). Bearing plate (106) is illustrated abutting against nut (112). In alternative embodiments of the invention there may be more than one nut installed on the member. A single shearing element (50) is shown placed within the second bore (38) as more fully described below.

Figure 3:
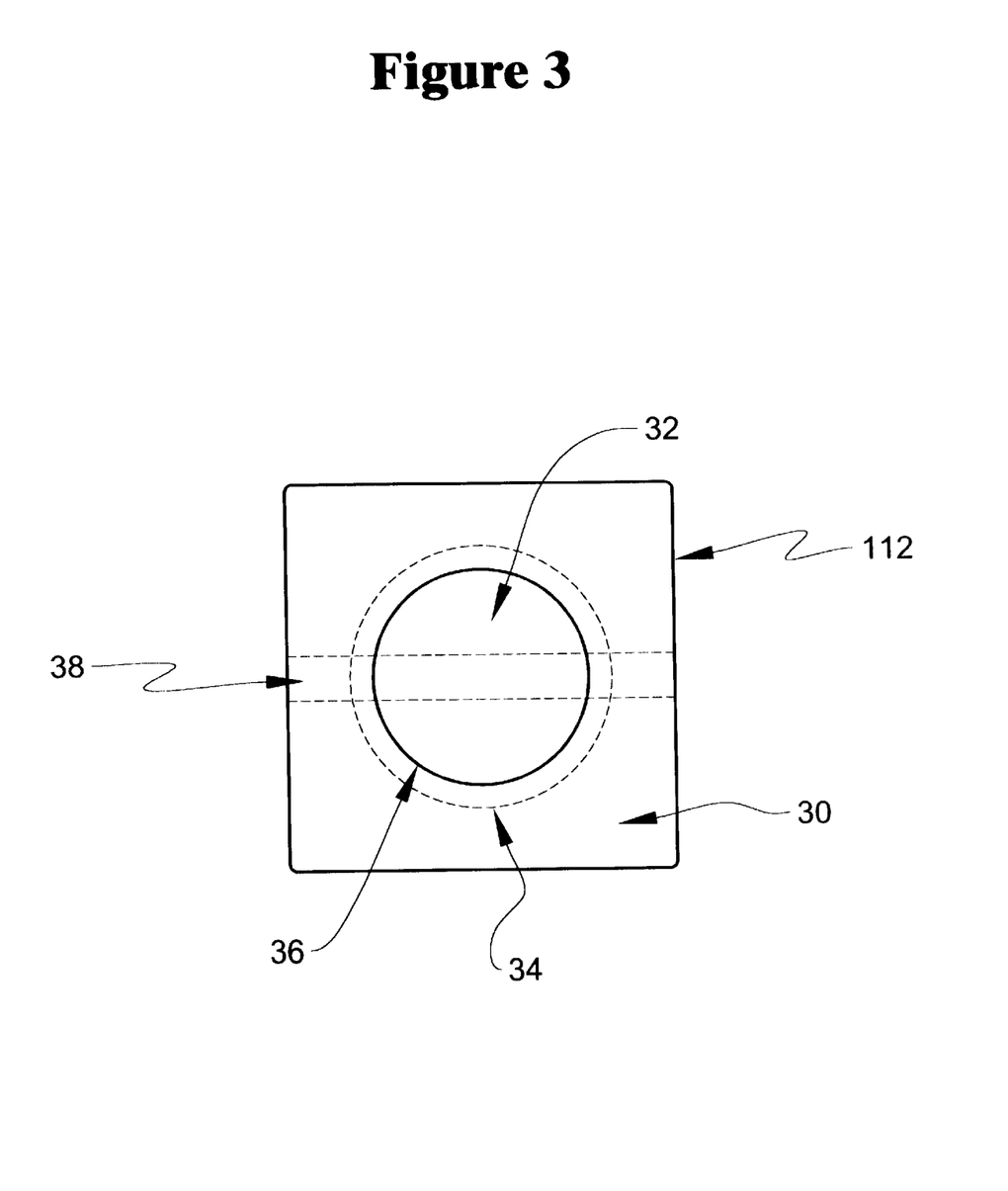
FIG. 3 is a top view of the nut of a preferred embodiment of the invention.

Referring to FIG. 3, there is illustrated in sectional top view the nut (112) in a preferred embodiment of the invention having a square body portion (30). A first threaded bore (32) extends axially through the body (30) of the nut. The outside diameter of the thread is represented by line (34) and the inside diameter of the thread is represented by line (36). The nut also comprises a second bore (38) positioned intermediate of the length of the nut and extending transversely through the top portion of the nut. In other embodiments of the invention there may be more than one second bore positioned intermediate of the length of the nut. Referring back to FIG. 2, the second bore (38) is located in the top portion of the nut (112). It is understood that nut (112) is sufficiently dimensioned so that the placement of second bore (38) or more than one second bore within the body of the nut does not degrade is strength or its ability to tensionably hold the bearing plate against the rock face. FIG. 4 illustrates that the apparatus further comprises an additional third bore (40) intermediate of the threaded portion of the reinforcing member (101). As shown in FIG. 2, bore (38) in the nut and bore (40) in the threaded portion of the member are axially aligned to permit the insertion of a shearing element (50) that fixes nut (112) to threaded portion (101) and prevents independent movement between them. It is understood that the third bore (40) may be located anywhere along the length of the threaded portion of the member (101) to suit installation requirements. It is further understood that when more than one second bore is placed in the nut there will be corresponded co-axial third bores in the member threaded portion.

Figure 5:
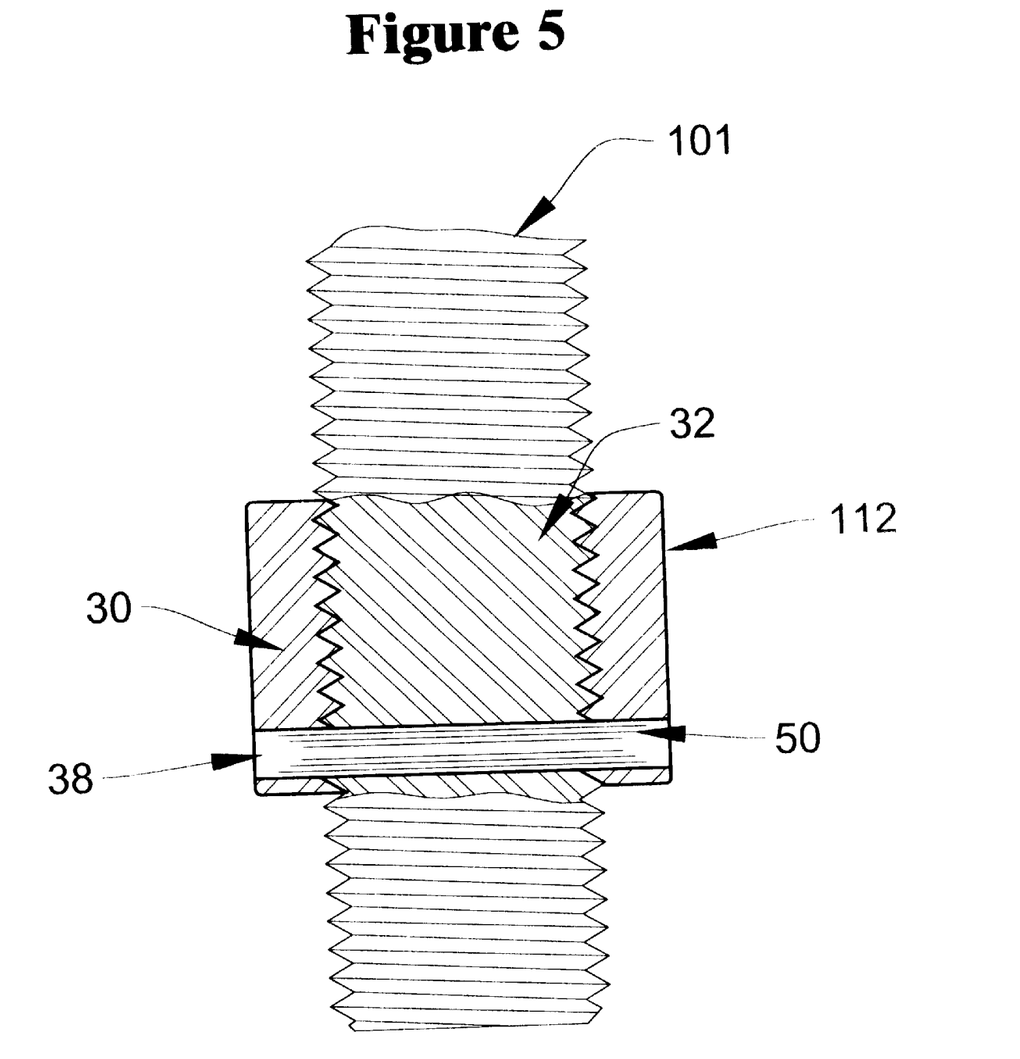
FIG. 5 is a partial sectional side view and FIG. 6 is a partal front view of the nut and shearing element used a preferred embodiment of the invention.
Figure 6:
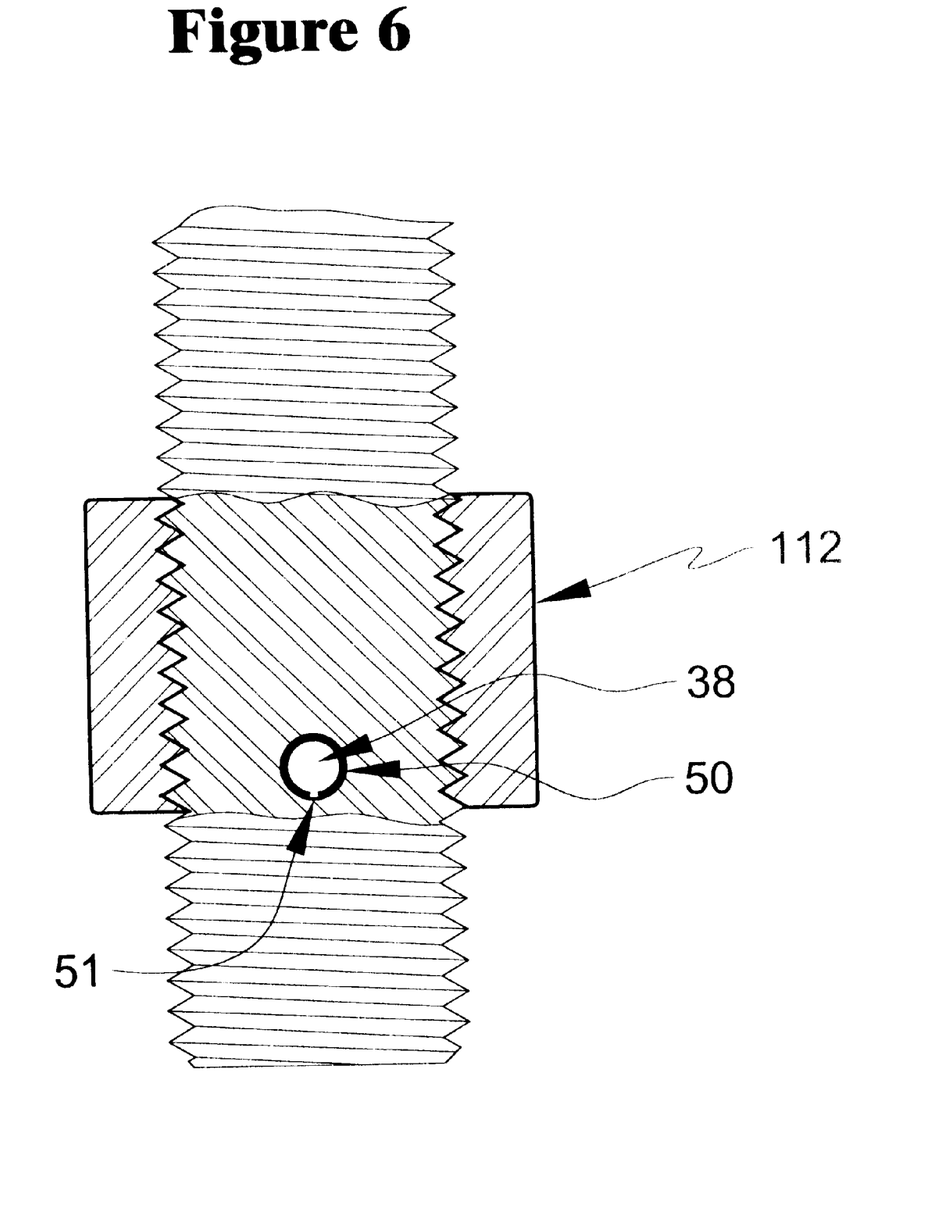

Referring to FIG. 5 there is shown in greater detail and in sectional side view the single shearing element (50) of a preferred embodiment of the invention. Nut (112) is shown having body (30) and first bore (32) extending axially along the body of the nut. Also shown is second bore (38) extending transversely through the top portion of the nut. Within second bore (38) is inserted shearing element (50) that fixes nut (112) to the threaded member (101). Shearing element (50) fits within the length of the second bore (38) and does not extend beyond the outer edges of the second bore. Referring to FIG. 6 there is shown in front elevation view, nut (112) and second bore (38) with shearing element (50) inserted in the second bore. Shearing element (50) forms a member having compression gap (51). Shearing element (50) is manufactured from material having significant tensile strength, such as spring steel. In its first unbiased state, shearing element has a diameter that is slightly larger than the diameter of the aligned second and third bores (38 and 40). The shape and compressibility of shearing element (50) permits the shearing element to adopt a second fully biased configuration so that the sides of the compression gap (51) are brought together. The resulting shape has a diameter slightly smaller than the diameter of the aligned second and third bores (38 and 40) so that the shearing element slides easily into the second and third bores while a compressive force maintained on the shearing element. Once the shearing element is placed within the aligned second and third bores the compressive force is released and the shearing element is permitted to expand into a third partially biased position within the diameter of the aligned second and third bores. Since the diameter of the second and third bores is less than the diameter of the shearing element in its unbiased state, a significant biasing force is generated by the shearing element against the inside walls of the second and third bores (38). This biasing force has two advantages. The first is that the shearing element acts like a compression clip. It may be easily inserted into the aligned bores (38) and (40) during assembly of the apparatus by compressing the element beyond its resting state and inserting it into the aligned bores. Then once the shearing element is released, it expands to exert significant biasing forces against the walls of the bores. Therefore, prior to shearing the shearing element will remain stationary within the bores and will not drop out and be lost or be displaced by agitation. The second advantage occurs after the shearing element has been sheared. Since each residual portion of the sheared element continues to exert a biasing force it will remain with its respective bore after shearing. This prevents pieces of the shearing element becoming jammed in the threads and damaging the threads and prevents the pieces of the shearing elements from causing a safety hazard to nearby workers. Shearing element (50) is manufactured from a suitable tensile material. Shearing element has a length slightly less than the length of the second bore (38) so that no portion of the shearing element extends beyond the body of the nut. The circumference of the shearing element is slightly less than the circumference of the bores (38 and 40) thus permitting biasing forces (52) to act upon the inside walls of the bores. Other shearing elements can be used such as solid pin members, cotter pins, bolts and nails.

Referring back to FIGS. 1 and 4, the nut (112) has a first pre-torgue$_{max}$ temporary operating position as illustrated in FIG. 1 and a second post-torque$_{max}$ permanent operating position as illustrated in FIG. 4. In FIG. 1, the nut (112) is temporarily fixed to the threaded portion of the member (101) by a single shearing element (50) located within axially aligned transverse bore (38) and bore (40) in the threaded portion of the member (not shown). The nut (112) and the member (101) are rotatable together as a single unit. Nut (112) will be coupled to an at least one nut rotation device (47) to impart a rotation (105) to the nut and member. Therefore, with the nut fixed in its first temporary operating position by shearing element (50), the ribbed portion of the member (100) is inserted into the drilled hole (16) with the adhesion material (102) placed in the drilled hole prior to insertion of the member or after insertion of the member. Sufficient torque is applied to nut (112) so as to rotate the ribbed portion (100) thus agitating the adhesion material (102) so that it mixes and fills annulus (103). The nut and member may be rotated clockwise or counter clockwise as desired. As the adhesion material cures it becomes stiffer and more difficult to rotate the member within the material. Therefore, additional torque must be applied to the nut. At a predetermined amount of torque$_{shear}$ applied to the nut selected to coincide with the cured stiffness of the adhesion material used, shearing element will shear permitting nut

(112) to rotate freely along the threaded portion of the member (101). Since the remnants of the shearing element do not interfere with the threads there is negligible residual torque on the nut as it advances towards the rock face. The nut and bearing plate (106) are then advanced along the length of the member so that the shearing plate comes into abutting contact with the rock face (110). The nut (112) now assumes its second post-torque$_{max}$ permanent operating position as shown FIG. 4. In its second permanent operating position, nut (112) is abutted against bearing plate (106) that is in turn abutting against the rock face (110). Adhesion material (102) fills annulus (103) and has cured to a desired hardness so that stabilizing forces can be transmitted between the rock formation and the ribbed portion (100). In this configuration, a predetermined amount of torque$_{max}$ is added to nut (112) to tension the member. The amount of torque torque$_{max}$ is dependent upon the length of the member, the type of adhesion material used and the application of the system. As it is torqued, nut (112) forces plate (106) against rock face (110), which in turn exerts compressive forces (42) between the unstable rock (12) and the stable rock (14). The torquing of nut (112) also creates tension forces (44) in the ribbed portion (100) now anchored to the stable rock (14) by the adhesion material (102) further adding stability to the rock formation.

After the shearing element (50) has sheared, remnants remain within their respective bores to prevent safety hazards to the workers and damage to the threads (101). Therefore, additional items may be added to the threaded portion (101) as desired. For example, a second square nut may be placed on the bar (101) and torqued behind the first nut (112).

A method is provided for anchoring unstable rock formations in underground mines using the apparatus as follows:

-continued

Rotate the nut towards the rock face until the bearing plate is in an abutting contact with the rock face Apply the predetermined amount of torque to the nut in order to apply the required compressive forces to the rock formation and the required tensile forces to the anchored reinforcing member Although the description above contains many specifications, these should not be construed as limiting the scope of the invention but as merely providing illustrations of some of the presently preferred embodiments of this invention. Thus the scope of the invention should be determined by the appended claims and their legal equivalents rather than by the examples given.

What is claimed is:

1. A rock bolting apparatus for use with adhesive material for insertion into a drilled hole penetrating the face of the rock formation, said hole transversing unstable rock strata and penetrating into stable rock strata in underground mines, said apparatus comprising:
   a. a tensionable reinforcing member inserted into the drilled hole the member having a threaded portion at one end extending out of the borehole; and an opposite end placed totally within the drill hole and adapted to be embedded in adhesive material placed within the drill hole; wherein said member threaded portion includes at least one bore intermediate thereof and positionable anywhere along the length thereof
   b. at least one square nut threadably receivable by the member threaded portion said nut having at least one bore positioned there within and intermediate thereof equal in diameter with the at least one bore through the member threaded portion and extending transversely through the nut, the nut being sufficiently dimensioned so that said at least one bore does not degrade the strength thereof; wherein said at least one nut has a first temporary operation position located at the top of the member threaded portion and wherein the nut and member are rotatable together for mixing adhesive material in the drill hole and a second permanent operation position located at the bottom of the member threaded portion so that the bearing plate is in abutting contact with the rock face;
   c. at least one bearing plate retained on the rod threaded portion by the nut;
   d. at least one shearing element inserted into the axially aligned nut and member threaded portion bores for fixing said nut in said first operating position and subsequently, upon shearing, permitting the nut to rotate freely on the member threaded portion so that it can advance to said second permanent operating position wherein the at least one shearing element fits within the length of the axially aligned nut and member threaded portion bores and wherein the at least one shearing element comprises a member having a compressible diameter having a compressible gap along its length.

2. The apparatus as clamed in claim 1 wherein said shearing element is manufactured from material having significant strength to resist shear forces generated by a predetermined amount of torque being applied to the nut.

3. The apparatus as claimed in claim 2 wherein the shearing element is adapted to fail in shearing mode when a torque greater than said predetermined amount of torque is applied the nut.

4. The apparatus as claimed in claim 3 wherein the shearing element is manufactured from tensile steel.

5. The apparatus as claimed in claim 4 wherein the shearing element has a first unbiased state wherein the diameter of the unbiased shearing element has a diameter that is slightly larger than the diameter of the axially aligned bores; and, wherein the shearing element has a second fully biased state wherein the compression gap is compressed so that the sides of the shearing element are brought together so that the resulting compressed shape has a diameter slightly smaller than the diameter of the aligned bores so that the shearing element slides easily into the bores while a compressive force is maintained on the shearing element; and, wherein the shearing element has a third partially biased state adopted once the shearing element is placed within the aligned bores and the compressive force on the shearing element is released whereby the shearing element expands into the diameter of the aligned bores and exerts a biasing force the inside walls of the axially aligned bores.

6. A rock stabilizing apparatus for use with a hardenable adhesion material for insertion into a drilled hole penetrating the face of a rock formation, said drilled hole transversing unstable rock strata and penetrating into stable rock strata in underground mines, said apparatus comprising a tensionable reinforcing member having rotation means for rotating said tensionable reinforcing member in order to mix the hardenable adhesion material, said rotation means comprising at least one nut having:
   a. a pre-torque$_{max}$ state wherein said at least one nut is temporarily fixed by a single shearing means in a first operating position at a predetermined location on the threaded bottom portion, the at least one nut adapted to receive an at least one nut rotating device; the at least one nut having a square body portion and a threaded first bore extending axially along the body of the at least one nut, said first bore adapted to threadably engage the threaded portion of the member for fastening the at least one nut to it;
   b. a post-torque$_{max}$ state wherein the at least one nut is advanced to a second permanent operating position; wherein a rotating movement is imparted by the at least one nut rotating device to the at least one nut in its pre-torque$_{max}$ state so that the at least one nut and the tensionable reinforcing member rotate together thereby mixing the hardenable adhesion material placed adjacent to the member top ribbed portion within the drilled hole;

c. said single shearing means comprising:
  i. a second bore positioned within the at least one nut intermediate of the length of the at least one nut, said second bore extending transversely through the at least one nut and further wherein the at least one nut is dimensioned so that the placement of the second bore does not degrade the strength of the at least one nut;
  ii. at least one third bore positioned within the threaded portion of the member intermediate the length thereof, said at least one third bore positioned anywhere along the length of the threaded portion of the member, wherein the diameter of the at least one third bore is equal to the diameter of the second bore, wherein the second bore and said at least one third bore are axially aligned, and;
  iii. a shearing element inserted into the axially aligned second bore and at least one third bore, said shearing element fitting within the length of the second bore of the at least one nut, the shearing element adapted to shear when a predetermined torque$_{shear}$ is applied to the at least one nut, said torque$_{shear}$ achieved when the hardenable adhesive material has partially hardened; wherein said shearing element comprises a tensile steel member having a compressible diameter, wherein said steel member is able to resist shear forces at least as great as those generated by said predetermined torque$_{shear}$ applied to the at least one nut and further wherein the member is adapted to fail in shearing mode when a torque greater than the predetermined torque$_{shear}$ is applied.

7. The apparatus as claimed in claim 6 wherein the tensile steel member has:
   a. a first unbiased state having a first diameter larger than the diameter of the axially aligned second and at least one third bores;
   b. a second fully biased state having a second diameter smaller than the diameter of the axially aligned second and at least one third bores; and,
   c. a third partially biased state adopted once the tensile steel member is inserted within the aligned second and at least one third bore holes, and wherein said compressing force is released to permit the tensile steel member to expand within the aligned second and at least one third bore holes.

8. The apparatus as claimed in claim 7 wherein said predetermined torque$_{shear}$ is dependent upon the curing properties of the adhesion material.

* * * * *